Sept. 15, 1936.    J. H. COHEN    2,054,361
SPLASH GUARD FOR VEHICLE WHEEL FENDERS
Original Filed April 23, 1932
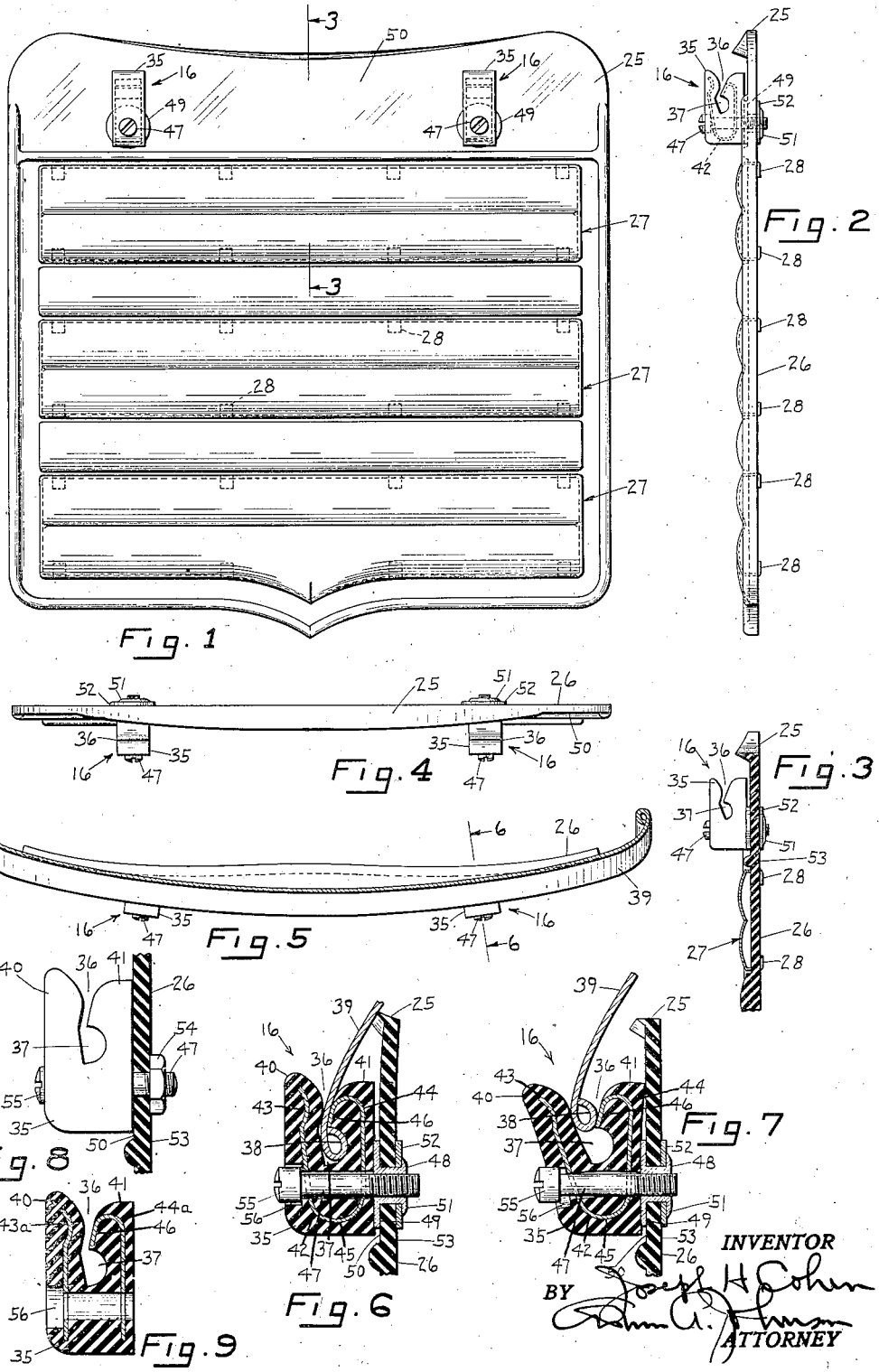

Patented Sept. 15, 1936

2,054,361

UNITED STATES PATENT OFFICE 2,054,361

SPLASH GUARD FOR VEHICLE WHEEL FENDERS

Joseph H. Cohen, Bridgeport, Conn., assignor to Casco Products Corporation, Bridgeport, Conn., a corporation of Connecticut Original application April 23, 1932, Serial No. 607,125. Divided and this application December 29, 1932, Serial No. 649,278

7 Claims. (Cl. 280—152)

This invention relates to splash guards for vehicles, especially automobiles, and more particularly to an improved form of means for attaching such guards in operative position. It is a division of my copending application Serial No. 607,125, filed April 23, 1932, now Patent No. 2,000,220, May 7, 1935.

Various means have heretofore been proposed for securing splash guards to vehicle wheel fenders, but those which are easily attached and do not mar the finish on the end of the fender are likewise easily detached and liable to fall off or be stolen. These prior proposals, which have been secured in place by means of tools, have had the disadvantage of marring the finish of fenders to which they are attached.

It is an object of this invention to provide a splash guard having attaching means which will not mar the fender and which also is secured in place by means of a tool such as a screwdriver and, preferably, in addition thereto, be so arranged that the splash guard when applied to the end of the fender will hold itself to the fender prior to and while being permanently secured in place, thereby permitting both hands to be used in the securing operation.

A feature of the present invention is the provision of a set of clamps on the splash guard with integral spaced jaws on a one-piece body, so arranged that the clamps may be moved relatively to various angular positions so as to better fit and connect the splash guard to those fenders having a pronounced curvature at the end.

Other features and advantages will hereinafter appear.

In the drawing—

Figure 1 is a front view of one embodiment of this invention, this being the form at present preferred.

Fig. 2 is a side view of the splash guard shown in Figure 1.

Fig. 3 is a sectional view of the splash guard shown in Figure 1, taken on the line 3—3 thereof.

Fig. 4 is a top plan view of the splash guard shown in Figure 1.

Fig. 5 is a sectional view of a portion of an automobile fender, showing the splash guard of the present invention applied thereto.

Fig. 6 is a sectional view of one form of clamping means of the splash guard shown in the accompanying drawing, the section being taken substantially on the line 6—6, Fig. 5.

Fig. 7 is a view similar to Fig. 6, showing the positions of the parts when the splash guard is being applied on the fender.

Fig. 8 is a view similar to Fig. 6, but of a modified form, wherein the nut member is not permanently secured to the curtain but is placed on the screw so as to engage the reverse side of the curtain.

Fig. 9 is a view similar to Fig. 6 of another modification of the clamping means, wherein the metal insert in the rubber block is made of two parts instead of one, as shown in Fig. 6.

For the purpose of illustration, and to show a practical embodiment of the new form of connecting means 16 provided by the present invention, the latter is disclosed embodied in one form of splash guard of the aforesaid application, but it should be understood that it may be used equally well with various types of splash guards. This splash guard comprises a backing sheet 26, which may be made of rubber, leather, canvas, or the like, and bars 27 are connected together for articulation by being attached to the backing sheet with fingers 28 formed on the bars passing through the backing sheet 26 and being clinched over on the other side thereof.

However, so far as the broader aspects of the present invention is concerned, it matters little what type of vacuum sheet or splash guard per se is used, for it is within the purview of this invention to use it with a perfectly flat piece of rubber or other material of desired dimensions.

Preferably, the backing sheet is provided with a top portion 25, integral therewith, proportioned to fit on the underside of the fender 39 of a car in order to prevent mud, water and the like from dripping onto the outer face of the backing sheet from the underside of the fender when it is in place.

Coming now to the important aspects of the present invention, it should be particularly noted that the present invention provides an improved means 16 for attaching a splash guard, for example, a backing sheet 26, to the end of a vehicle wheel fender. This means, as shown in detail in Figs. 6 through 9, preferably comprises a block of rubber 35 having a vertical slot 36 and a transversely extending hole 37, the slot permitting a bead 38 on the lower end of a fender 39, see Fig. 7, to enter the transverse hole 37, the portions 40 and 41 of the block spreading, as shown in Fig. 7, to permit this to occur. When the bead 38 is located in the hole 37, as shown in Fig. 6, the portions 40 and 41 of the block spring together again and close the slot against the passage of the bead 38. The block of rubber is attached to the curtain in a manner hereinafter referred to and constitutes, in the form shown, a quick and easy means for attaching the splash guard to the fender, for it is merely necessary to force the rubber block 35 over the bead end of the fender.

However, it would be likewise easily removed, and might fall off or easily be pulled off in case someone desired to steal it. Consequently, the resiliency of the parts 40 and 41 of the block are not relied upon, according to the present invention, to secure the splash guard to the fender, but this is accomplished by more positive and permanent means.

As shown in Figs. 6 and 7, this is done by providing with the rubber block 35 a U shaped clamp 42 comprising a pair of legs 43 and 44 connected by a cross-piece 45. The U shaped clamp 42 may be provided externally of the block of rubber 35 if desired, but, in order that the finish of the fender 39 will not be marred by its application, it is preferable that the U shaped clamp be embedded in the rubber block as shown in Figs. 6 and 7, and when this is done, the leg 44 is provided with a downwardly bent portion 46 to engage the inner surface of the fender directly over the bead 38. This leg 44 may extend to the exterior of the block and directly engage the inner surface of the fender, for it is not so important that that portion of the fender have its finish protected against damage.

The clamp 42 is preferably made of resilient material and is normally biased so as to urge the parts 40 and 41 of the rubber block together, this augmenting the natural resiliency of the rubber block.

The U shaped clamp 42 is provided with a screw 47 passing through holes in the legs 43 and 44 of the clamp and entering a nut member 48 which may be formed with a flange 49 engaging the front surface 50 of the curtain and may have its inner portion peened over to form a flange 51 engaging a washer 52 against the reverse surface 53 of the sheet 26.

However, as shown in Fig. 8, a loose nut 54 may be applied to the rear end of the screw 47 so as to engage the reverse surface 53 of the sheet 26.

The screw 47 is provided with a head 55 so that when the screw is turned it will engage the rubber block or, as preferred and as shown, will directly engage the leg 43 of the clamp 42, the block being provided with a hole 56 to receive the head of the screw.

When the splash guard is to be attached to the end of the fender, the screw 47 is loosened as shown in Fig. 7, in which condition it permits the arm 43 of the clamp and the part 40 of the block to spring outwardly when the bead 38 is forced downwardly through the slot 36 in the hole 37. Upon receiving the bead in the hole, the leg 43 will spring back toward the leg 44 and thus close the slot and hold the block of rubber and curtain to the fender. The screw 47 is then tightened and in being tightened engages the leg 43 and draws the legs 43 and 44 together, the leg 44 being backed by the flange 49 and/or the sheet 26 and nut 54, according to the construction employed. This causes the end of the fender and the bead thereon to be firmly and positively gripped by the attaching means 16 and prevents the separation of the legs 43 and 44 to such an extent as would permit the splash guard to be pulled off the fender.

The bent-over portion 46 on the leg 44 of the U shaped clamp constitutes a hook and, engaging over the bead 38 of the fender 39, positively holds the attaching means 16 and the curtain to the fender, in contradistinction to merely holding it there by friction.

By having the clamps 16 of substantially one piece construction the danger of losing parts is minimized and a proper alignment between the two jaws 40 and 41 is at all times positively maintained. Further, the method of connecting the clamp 16 to the splash guard 26; viz, by having the clamping screw 55 pass through the block at a point so that it can squeeze the two jaws together and at the same time provide a pivotal joint for the block, the clamps may be moved angularly so that the jaws are on a proper plane with the beads and curved ends of fenders. This gives the advantage of permitting a connection between the splash guard and fender without unduly twisting the top end of the splash guard and of providing a more rigid connection to the fender than in those types where the clamp is formed integral with the splash guard or is not capable of angular movement relative thereto.

In order to remove the splash guard from the fender, it is necessary to employ a screwdriver and loosen the screws 47. Of course, it should be understood that there are preferably two attaching means 16, one located at each side of the splash guard, although a larger number may be employed, if desired.

Instead of the U shaped clamp 44 having a connecting part 45, it may be arranged as shown in Fig. 9, where the legs 43a and 44a are separate and are embedded in the rubber block 35.

Other variations and modifications may be made within the scope of this invention and portions of the improvements may be used without others.

Having thus described the invention, what is claimed as new and for which it is desired to obtain Letters Patent, is:—

1. A splash guard for a vehicle-wheel comprising a curtain and means for attaching the same to a vehicle-wheel fender comprising a substantially U-shaped clamp attached to the curtain adjacent the top thereof, said U-shaped clamp comprising a pair of relatively movable metal legs united at their lower ends and having their free ends biased to normally move toward each other to embrace the end of the fender and receive a bead provided thereon in such manner as to restrain the guard against falling from the fender, and a screw passing through the legs of the U-shaped clamp below the free ends thereof for securing said legs together in bead-clamping position.

2. A splash guard for a vehicle wheel comprising a curtain and means for attaching the same to a vehicle-wheel fender comprising a substantially U-shaped clamp physically separate from and attached to the curtain adjacent the top thereof, said U-shaped clamp comprising a pair of relatively movable metal legs united at their lower ends and having their free ends biased to normally move toward each other to embrace the end of the fender and receive a bead provided thereon, a screw passing through the legs of the U-shaped clamp below the free ends thereof, and a nut structurally united to the curtain for receiving the screw which when turned secures the free ends of the legs of the U-shaped clamp together and against the bead on the fender and secures the clamp and curtain together.

3. A splash guard for a vehicle wheel comprising a curtain and means for attaching the same to a vehicle-wheel fender comprising a pair of blocks of rubber, means for rotatably securing each of said blocks to the curtain so as to be self-adjusting thereon angularly relative to each other and the curtain, said blocks each having a vertical slot and a transverse hole intersected by said slot, said slot permitting the passage of a bead on the end of the fender to said hole, and resilient means normally biased to cause said vertical slot to be substantially closed to prevent the bead casually passing therethrough.

4. A splash guard for a vehicle wheel comprising a curtain and means for attaching the same to a vehicle-wheel fender comprising a block of rubber secured to the curtain and having a vertical slot and a transverse hole intersected by said slot, resilient means embedded in said block and normally biased to cause said slot to be substantially closed to prevent the bead casually passing therethrough, and screw operated means passing through said block of rubber and into said curtain, forming a pivot about which said block may be moved arcuately relative to the curtain and the fender for positively compressing the block and closing said slot and causing the end of the fender and the bead thereon to be gripped within said slot and transverse hole.

5. A splash guard for a vehicle wheel comprising a curtain and means for attaching the same to a vehicle-wheel fender comprising a block of rubber secured to the curtain and having a vertical slot and a transverse hole intersected by said slot, said slot permitting the passage of a bead on the end of the fender to said hole, a screw passing through said block of rubber and into said curtain, forming a pivot about which said block may be moved arcuately relative to the curtain and to the fender, adapted to positively close said slot, and a nut engaging the opposite surface of the curtain and with said screw constituting means for attaching the block of rubber to the curtain and to the fender at various angular positions.

6. A splash guard for a vehicle wheel comprising a curtain and means for attaching the same to a vehicle-wheel fender comprising a block of rubber secured to the curtain and having a vertical slot and a transverse hole intersected by said slot, said slot permitting the passage of a bead on the end of the fender to said hole, screw operated means passing through said block of rubber and into said curtain, forming a pivot about which said block may be moved arcuately and positively closing said slot, and a clamping member of substantially U-shaped form in the block of rubber and comprising legs located on opposite sides of the said vertical slot and transverse hole and passed through by said screw means whereby said screw means acts through said clamping member to cause the end of the fender and the bead thereon to be gripped by the walls of the vertical slot and transverse hole respectively of the block.

7. An automobile fender splash guard, comprising a flexible apron; a pair of clamping elements, each having a body and having a screw hole passing therethrough; threaded screw-receiving means on the apron; and a screw passing through the hole in each clamp element, and screwed into said screw-receiving means, upon which said body of the clamping elements may be relatively rotated to any desired angle with respect to the fender.

JOSEPH H. COHEN.